(12) United States Patent
Mizuguchi

(10) Patent No.: US 6,287,709 B1
(45) Date of Patent: Sep. 11, 2001

(54) SPIN-VALVE FILM, MAGNETORESISTANCE-EFFECT DEVICE AND MAGNETORESISTANCE-EFFECT MAGNETIC HEAD

(75) Inventor: Tetsuya Mizuguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/397,068

(22) Filed: Sep. 16, 1999

(30) Foreign Application Priority Data

Sep. 21, 1998 (JP) .............................................. P10-266989

(51) Int. Cl.$^7$ ........................... B32B 15/01; B32B 15/18; G11B 5/127; H01F 1/00
(52) U.S. Cl. ........................... 428/611; 428/680; 428/681; 428/693; 428/679; 428/682; 360/113; 252/62.55; 365/158
(58) Field of Search .................... 428/662, 660, 428/680, 681, 615, 661, 692, 693, 697, 699, 900, 611, 679, 682; 360/113, 126; 252/62.55; 117/939, 937; 365/158

(56) References Cited

U.S. PATENT DOCUMENTS

| | | | |
|---|---|---|---|
| 5,422,571 | * 6/1995 | Gurney et al. | 324/252 |
| 5,729,409 | * 3/1998 | Ohashi et al. | 360/113 |
| 5,976,713 | * 11/1999 | Fuke et al. | 428/692 |
| 6,115,224 | * 9/2000 | Saito | 360/324.1 |
| 6,118,624 | * 9/2000 | Fukuzawa et al. | 360/113 |

* cited by examiner

Primary Examiner—Deborah Jones
Assistant Examiner—Michael LaVilla
(74) Attorney, Agent, or Firm—Sonnenschein, Nath & Rosenthal

(57) ABSTRACT

A spin-valve film which enables a high output to be obtained and thermal stability to be improved without a necessity of reducing the thickness of films which constitute the spin-valve film, a spin valve type magnetoresistance-effect device and a magnetic head comprising the spin valve type magnetoresistance-effect device. A spin-valve film according to the present invention comprises a fixed layer in which a direction of magnetization is to be directed to substantially a predetermined direction; a non-magnetic layer; and a free layer in which a direction of magnetization is to be changed by an external magnetic field, wherein the free layer comprises at least a laminate film having a Ta film and a NiFeTa film.

6 Claims, 4 Drawing Sheets

SPIN-VALVE FILM, MAGNETORESISTANCE-EFFECT DEVICE AND MAGNETORESISTANCE-EFFECT MAGNETIC HEAD

BACKGROUND OF THE INVENTION

1. Field of the Invention

The present invention relates to a spin-valve film, a magnetoresistance-effect device and a magnetoresistance-effect magnetic head.

2. Description of the Related Art

A magnetoresistance-effect magnetic head (hereinafter called an "MR head") is a reproduction-only magnetic head incorporating a magnetoresistance-effect device (hereinafter called an "MR device") which serves as a magnetization sensing device. The magnetoresistance-effect magnetic head has been put into practical use in a hard disc drive or the like. Since the recording density has been raised in recent years, a macro magnetoresistance-effect device incorporating a spin-valve film has been employed, the spin-valve film being a film which serves as an MR device for use in an MR head. The spin-valve film is formed by laminating a free layer structured such that the direction of the magnetization is to be changed by an exerted external magnetic field; a non-magnetic layer; a fixed layer fixed in which the direction of magnetization is to be directed to a substantially predetermined direction; and an antiferromagnetic layer.

To furthermore raise the recording density by using the MR head incorporating the spin-valve film, a high output from a narrow track is required. As a means for raising the output, reduction in the thickness of each of the films which constitute the spin-valve film is sometimes employed. If the thickness is reduced excessively, scattering depending on the spin from which the magnetoresistance effect can be obtained inhibited. Heat treatment is sometimes performed in the manufacturing process. If the thickness of each film constituting the spin-valve film is reduced, thermal stability of the spin-valve film deteriorates.

FIG. 1 shows the relationship between outputs of two types of spin-valve films having free layers, which constitute the spin-valve films and which have different thicknesses, and temperatures at which the heat treatment is performed. As can be understood from FIG. 1, a first spin-valve film having a free layer having a reduced thickness such that Ta/NiFe (2.5 nm)/CoFe (2.5 nm) enabled high outputs to be obtained as compared with a second spin-valve film having a thick free layer Ta/NiFe (5 nm)/CoFe (2.5 nm). As the temperature, at which the heat treatment is performed, is raised, the difference between the outputs of the two spin-valve film is reduced.

If the thickness of each layer constituting the spin-valve film is reduced as described above to raise the output immediately after the spin-valve film has been formed, the difference in the output is reduced after the heat treatment has been performed.

To obtain a high output even after the heat treatment has been performed, the output which is realized before the heat treatment is performed must be raised such that the thickness of each of the films constituting the spin-valve film is not reduced. As an alternative to this, the thermal stability of the spin-valve film must be improved. Under the present circumstances, any specific method cannot be provided.

SUMMARY OF THE INVENTION

Accordingly, an object of the present invention is to provide a spin-valve film which is capable of realizing a high output and which has improved thermal stability without a necessity of reducing the thickness of each of films constituting the spin-valve film, a spin valve type magnetoresistance-effect device and a magnetic head incorporating the spin valve type magnetoresistance-effect device.

According to one aspect of the present invention, there is provided a spin-valve film comprising: a fixed layer fixed in which a direction of magnetization is to be directed to substantially a predetermined direction; a non-magnetic layer; and a free layer in which a direction of magnetization is to be changed by an external magnetic field, wherein the free layer comprises at least a laminate film having a Ta film and a NiFeTa film.

Since the spin-valve film according to the present invention has the structure that the free layer comprises the laminate film having the Ta film and the NiFeTa film, the thermal stability can be improved. Thus, a high output can be obtained even after heat treatment has been performed.

According to another aspect of the present invention, there is provided a magnetoresistance-effect device comprising: a spin-valve film comprising a fixed layer in which a direction of magnetization is to be directed to substantially a predetermined direction; a non-magnetic layer; and a free layer in which a direction of magnetization is to be changed by an external magnetic field, an external magnetic field is detected by detecting change in the resistance of the spin-valve film, wherein the free layer of the spin-valve film comprises at least a laminate film having a Ta film and a NiFeTa film.

The magnetoresistance-effect device according to the present invention has the structure that the free layer of the spin-valve film comprises the laminate film having the Ta film and the NiFeTa film. Therefore, the thermal stability of the spin-valve film can be improved. Thus, a high output can be obtained.

According to another aspect of the present invention, there is provided a magnetoresistance-effect magnetic head comprising: a magnetoresistance-effect device detecting an external magnetic field by detecting change in the resistance of a spin-valve film for detecting a magnetic field of a signal obtained from a magnetic recording medium, wherein the spin-valve film comprises a fixed layer in which a direction of magnetization is directed to substantially a predetermined direction, a non-magnetic layer, and a free layer in which a direction of magnetization is changed by an external magnetic field, and the free layer of the spin-valve film comprises at least a laminate film having a Ta film and a NiFeTa film.

The magnetoresistance-effect magnetic head according to the present invention has the structure that the free layer of the spin-valve film of the magnetoresistance-effect device comprises the laminate film having the Ta film and the NiFeTa film. Therefore, the thermal stability of the spin-valve film can be improved. Thus, a high output can be obtained.

Other objects, features and advantages of the invention will be evident from the following detailed description of the preferred embodiments described in conjunction with the attached drawings.

DESCRIPTION OF THE PREFERRED EMBODIMENTS

Embodiments of the present invention will now be described.

Figure 1:
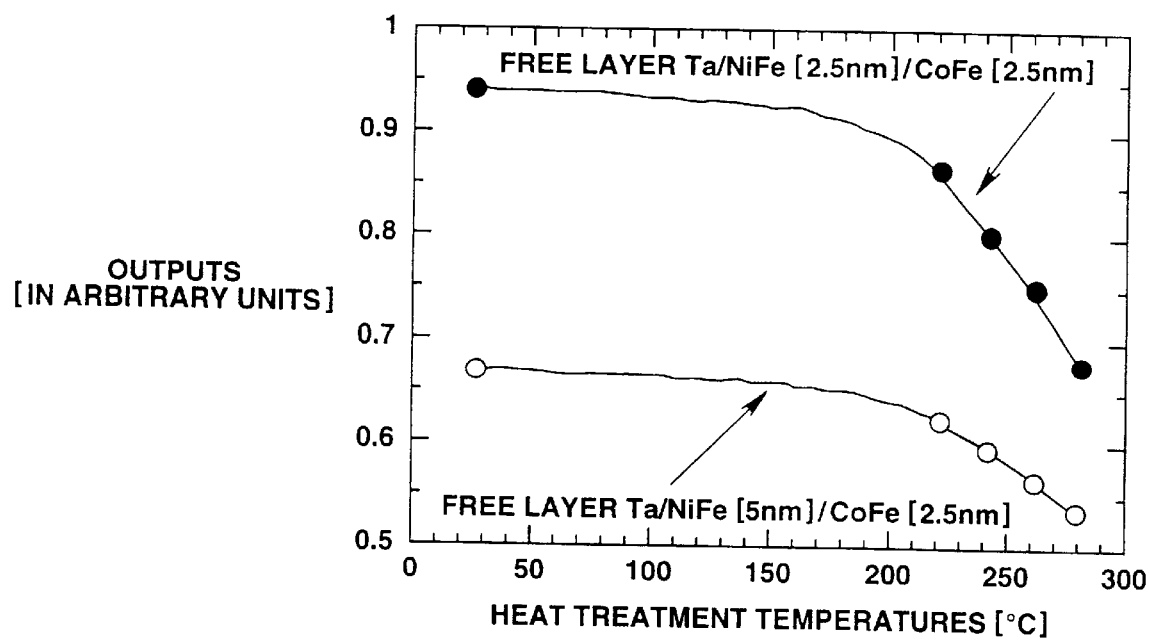
FIG. 1 is a graph showing the relationship between the thicknesses of films constituting a spin-valve film and outputs.
Figure 2:
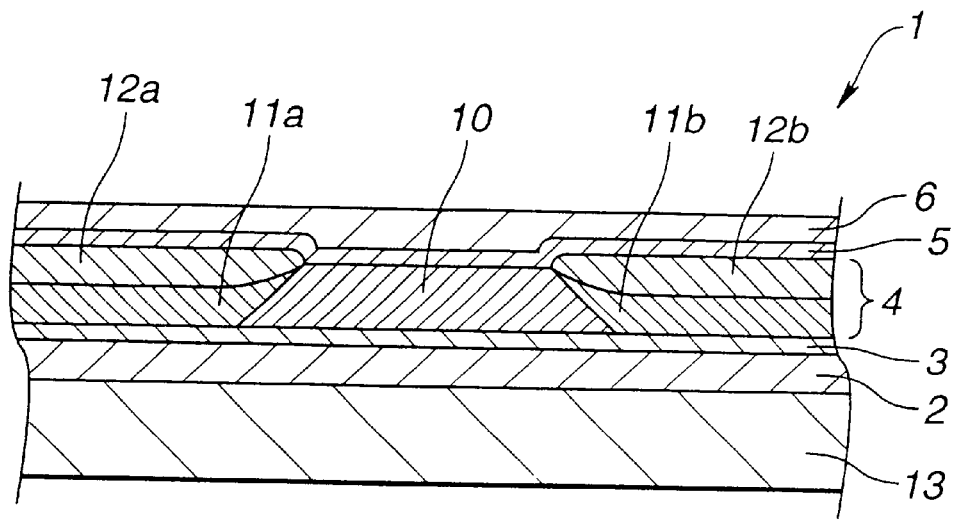
FIG. 2 is a cross sectional view showing an example of the structure of an MR head according to the present invention.

FIG. 2 is a cross sectional view schematically showing an example of the structure of an MR head according to the present invention. FIG. 2 is a cross sectional view of an MR head 1 taken along a plane which is in parallel with a plane opposite to a magnetic recording medium. FIG. 2 shows only a portion in the vicinity of a magnetization sensing portion in an enlarged manner. The MR head 1 comprises a substrate 13; a first soft-magnetic film 2 formed on the substrate 13; a first insulating film 3 formed on the first soft-magnetic film 2; an MR head device 4 formed on the first insulating film 3 and serving as a magnetization sensing device; a second insulating film 5 formed on the MR head device 4; and a second soft-magnetic film 6 formed on the second insulating film 5.

The substrate 13 is made of, for example, $Al_2O_3$—TiC on which an $Al_2O_3$ film is formed.

The first soft-magnetic film 2 serves as a lower-layer shield of the MR head 1. The first soft-magnetic film 2 is made of a soft magnetic material, such as sendust (FeAlSi) or amorphous material. The first insulating film 3 serves as a lower-layer gap of the MR head 1. The second insulating film 5 serves as an upper-layer gap of the MR head 1. The first insulating film 3 and the second insulating film 5 are made of, for example, $Al_2O_3$. The second soft-magnetic film 6 serves as an upper-layer shield of the MR head 1. The second soft-magnetic film 6 is made of, for example, NiFe.

The MR head device 4 is held between the first soft-magnetic film 2 and the second soft-magnetic film 6 through the first insulating film 3 and the second insulating film 5.

Figure 3:
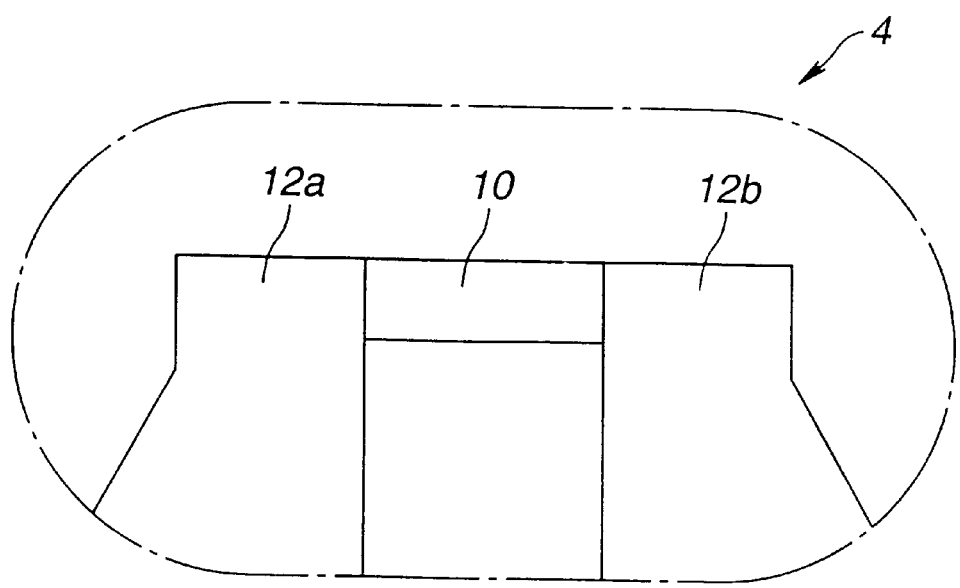
FIG. 3 is a plan view showing an example of the structure of an MR head device for use in the MR head shown in FIG. 2.

FIG. 3 is a plan view showing an example of the structure of the MR head device 4 for use in the MR head 1. As shown in FIGS. 2 and 3, the MR head device 4 comprises a spin-valve-type MR device (hereinafter called an "SV-type MR device") 10 disposed such that the lengthwise direction substantially runs parallel with the surface opposite to the magnetic recording medium and formed to have a planar shape which is substantially rectangular; hard magnetic films 11a and 11b formed at two ends of the SV-type MR device 10 in the lengthwise direction; an electrode film 12a connected to the hard magnetic film 11a; and an electrode film 12b connected to the hard magnetic film 11b. The MR head 1 is a so-called horizontal MR head incorporating the SV-type MR device 10, the lengthwise direction of which substantially runs parallel with the surface opposite to the magnetic recording medium. FIG. 3 is an enlarged view showing only a portion in the vicinity of the SV-type MR device 10 which is the characteristic of the present invention.

Figure 4:
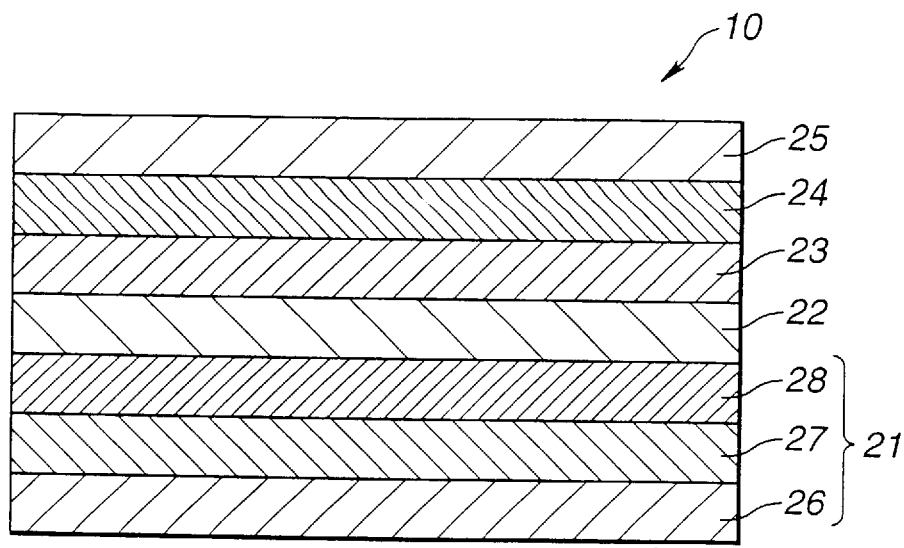
FIG. 4 is cross sectional view schematically showing an example of the structure of an SV-type MR device for use in the MR head device shown in FIG. 3.

As shown in FIG. 4, the SV-type MR device 10 has a structure in which a free layer 21, a non-magnetic layer 22, a fixed layer 23, an antiferromagnetic layer 24 and a protective layer 25 are laminated in this sequential order.

The free layer 21 and the fixed layer 23 are separated from each other by the non-magnetic layer 22. Moreover, the antiferromagnetic layer 24 is formed on the fixed layer 23. Thus, the fixed layer 23 made contact with the antiferromagnetic layer 24 is brought to a state in which the fixed layer 23 is magnetized in a predetermined direction. On the other hand, the direction of magnetization of the free layer 21 separated by the non-magnetic layer 22 is rotated even with a weak external magnetic field.

When an external magnetic field is applied to the SV-type MR device 10 structured as described above, the direction of magnetization of the free layer 21 is determined to correspond to the intensity of the external magnetic field. When the direction of magnetization of the free layer 21 and that of the fixed layer 23 are different from each other by 180°, that is, opposite to each other, the resistance of the SV-type MR device 10 is maximized. When the directions of magnetization of the free layer 21 and the fixed layer 23 are the same, the resistance of the SV-type MR device 10 is minimized. Therefore, the foregoing MR head device 4 uses change in the resistance of the SV-type MR device 10 to detect the external magnetic field.

The free layer 21 is formed by laminating, for example, a Ta film 26, a NiFeTa film 27 and a CoFe film 28. The non-magnetic layer 22 is made of, for example, Cu. The fixed layer 23 is made of, for example, CoFe. The antiferromagnetic layer 24 is made of, for example, a Mn disordered alloy, such as IrMn, or a Mn ordered alloy, or oxide, such as NiO or $\alpha$-$Fe_2O_3$. The protective layer 25 is made of, for example, Ta.

To furthermore raise the recording density, the output of the MR head 1 from a narrow track must be raised. As one of methods, a method may be employed with which the thickness of each of the layers for constituting the SV-type MR device 10 is reduced.

If the thickness of each of the layers for constituting the SV-type MR device 10 is reduced, scattering depending on the spin is reduced and the thermal stability against the heat treatment in the manufacturing process deteriorates. Therefore, a high output must be maintained even after the heat treatment has been performed by raising the output which is realized before the heat treatment without reducing the thickness of each of the layers of the SV-type MR device 10.

As a result of a variety of investigations, the inventor of the present invention has detected a fact that formation of the NiFeTa film 27 by adding Ta to the NiFe film which is laminated on the Ta film 26 which constitutes the free layer 21 enables the output of the SV-type MR device 10 before the heat treatment to be raised. Moreover, regulation of the content of Ta in the NiFeTa film 27 enables the thermal stability of the SV-type MR device 10 to be improved. When Ta is added to NiFe, introduction of a sense current into the layers, which do not contribute to scattering depending on the spin, can be prevented. Thus, a shunt current loss can be reduced, causing the output to be raised.

It is preferable that the NiFeTa film 27 is made of material having a composition expressed by $(NiFe)_{1-x}Ta_x$ and containing x by 0.09 to 0.16. In this case, the shunt current loss can be reduced and the orientation of crystal can be improved. As a result, scattering depending on the spin can be enhanced and the magnetoresistance effect can be improved.

As shown in examples to be described later, satisfactory thermal stability of the SV-type MR device 10 cannot be obtained if x is smaller than 9 or if x is larger than 16. Thus, the magnetoresistance effect after the heat treatment excessively deteriorates. When x is contained by 0.09 to 0.16, the thermal stability of the SV-type MR device 10 can be improved. As a result, a satisfactory magnetoresistance effect can be obtained even after the heat treatment has been performed so that a high output is obtained.

The hard magnetic films 11a and 11b are formed at the two ends of the SV-type MR device 10 in the lengthwise direction. Influences of the vertical bias magnetic fields exerted from the hard magnetic films 11a and 11b stabilize the distribution of magnetization of the free layer into a single magnetic domain state. Thus, the magnetoresistance characteristic of the SV-type MR device 10 can be brought to a stable state free from any hysteresis.

Since the hard magnetic films 11a and 11b have conductivity, sense currents are, in the MR head device 4, supplied from the leading electrode films 12a and 12b to the SV-type MR device 10 through the hard magnetic films 11a and 11b. In actual, the portion serving as the magnetization sensing portion for detecting the magnetic field from the magnetic recording medium is the SV-type MR device 10 formed between the hard magnetic films 11a and 11b. Therefore, the distance between the hard magnetic films 11a and 11b is the width of the track. The hard magnetic films 11a and 11b regulate the width of the track.

The leading electrode films 12a and 12b are constituted by conductive films and serving as electrodes to supply sense currents to the SV-type MR device 10 and the hard magnetic films 11a and 11b. The electrode film 12a is connected to the hard magnetic film 11a, while the electrode film 12b is connected to the hard magnetic film 11b. The sense currents are supplied to the hard magnetic films 11a and 11b and the SV-type MR device 10 through the leading electrode films 12a and 12b. The leading electrode films 12a and 12b have terminals (not shown) to establish the connections to the outside.

When an information signal is read from the magnetic recording medium by operating the MR head 1, the sense currents are supplied from the leading electrode films 12a and 12b to the SV-type MR device 10 through the hard magnetic films 11a and 11b. Thus, the sense current is allowed to flow in the lengthwise direction of the SV-type MR device 10. The sense current is used to change in the resistance of the SV-type MR device 10 occurring due to the magnetic field exerted from the magnetic recording medium. Thus, the information signal from the magnetic recording medium is reproduced. The free layer of the SV-type MR device 10 of the MR head 1 has been brought to the single magnetic domain by the hard magnetic films 11a and 11b. Therefore, Barkhausen noise which is produced owing to movement of magnetic domain walls can be prevented.

Although the above-mentioned embodiment has the structure that the free layer 21 is the laminate film structured such that Ta film/NiFeTa film/CoFe film, the present invention is not limited to this. The free layer 21 may be constituted by a laminate film of Ta film/NiFeTa film/Co film or a laminate film of NiFeTa film/alloy film containing Co.

The foregoing embodiment has been described about the lateral-type MR head structured such that the lengthwise direction of the SV-type MR device 10 substantially runs parallel with the surface opposite to the magnetic recording medium. Note that the present invention is not limited to this. The present invention may be applied to a so-called vertical-type MR head structured such that the lengthwise direction of the SV-type MR device 10 is made to be substantially perpendicular to the surface opposite to the magnetic recording medium.

In the foregoing embodiment, the SV-type MR device 10 is mounted on the magnetic head so that the SV-type MR device 10 serves as a magnetization sensing device for detecting an information signal from the magnetic recording medium. The present invention is not limited to this. The present invention may be applied to a structure in which the SV-type MR device 10 serves as a variety of sensors for detecting change in the magnetic field.

EXAMPLES

Spin-valve films were manufactured in the following example by changing the ratio of Ta contained in the NiFeTa film of the free layer.

Initially, the following films were formed on a substrate in the following sequential order: Ta (5 nm)/$(Ni_{80}Fe_{20})_{1-x}Ta_x$ (5 nm)/CoFe (2.5 nm)/Cu (2.75 nm)/CoFe (2 nm)/IrMn (6 nm)/Ta (5 nm). Thus, IrMn-CoFe type spin-valve film was manufactured. The foregoing spin-valve film had the structure that the Ta/$(Ni_{80}Fe_{20})_{1-x}Ta_x$/CoFe laminate film served as the free film and the Cu film served as the non-magnetic layer. The CoFe film served as the fixed layer, the IrMn film served as the antiferromagnetic layer and the Ta film served as the protective layer.

The ratio x (atom %) of Ta contained in the $(Ni_{80}Fe_{20})_{1-x}Ta_x$ film of the spin-valve film having the foregoing structure was changed. Thus, the characteristics of the spin-valve film were examined which included the resistance, an amount of change in the resistance, the rate of change in the magnetic resistance and the thermal stability.

Evaluation of Resistance

Figure 5:
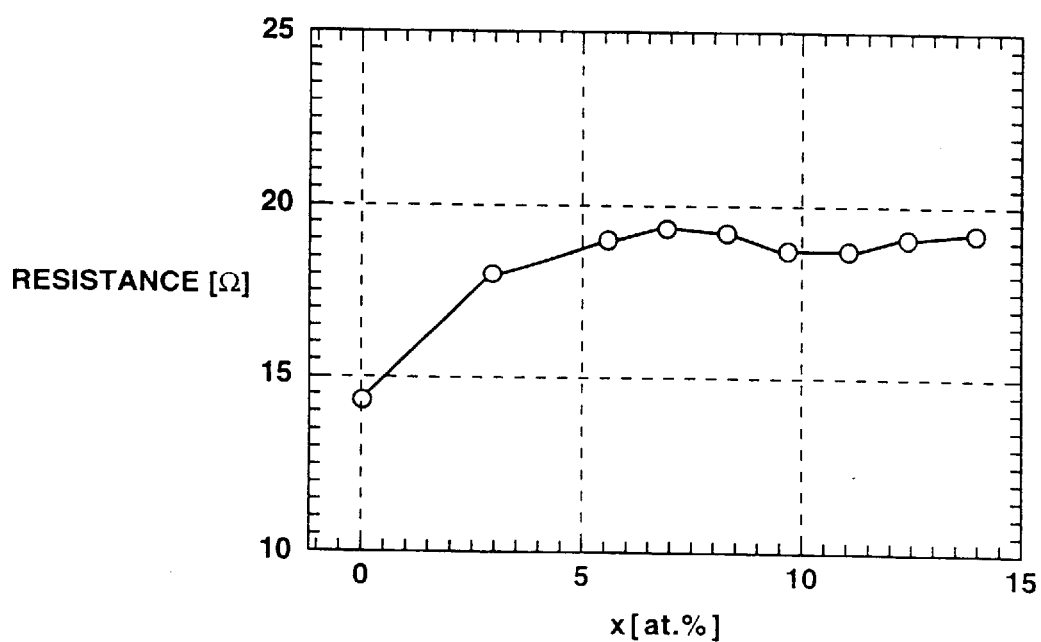
FIG. 5 is a graph showing the relationship between ratio x of Ta and resistance of the spin-valve film.

The relationship between the ratio x of Ta in the $(Ni_{80}Fe_{20})_{1-x}Ta_x$ film and resistance of the spin-valve film per unit area is shown in FIG. 5.

A can be understood from FIG. 5, the resistance is raised as the ratio x of the Ta is raised. When x=7, the resistance has a peak value. When x>7, the resistance of the spin-valve film is not substantially raised. The fact that addition of the third element to the NiFe film causes the specific resistance to be raised has been disclosed in M. Kitada et al. (J. Magn, Magn, Mater, 161, 1996, P397–403) and Mao-min Chen et al. (J. Appl. phys. 69, 1991, P5631 to 5633).

Figure 6:
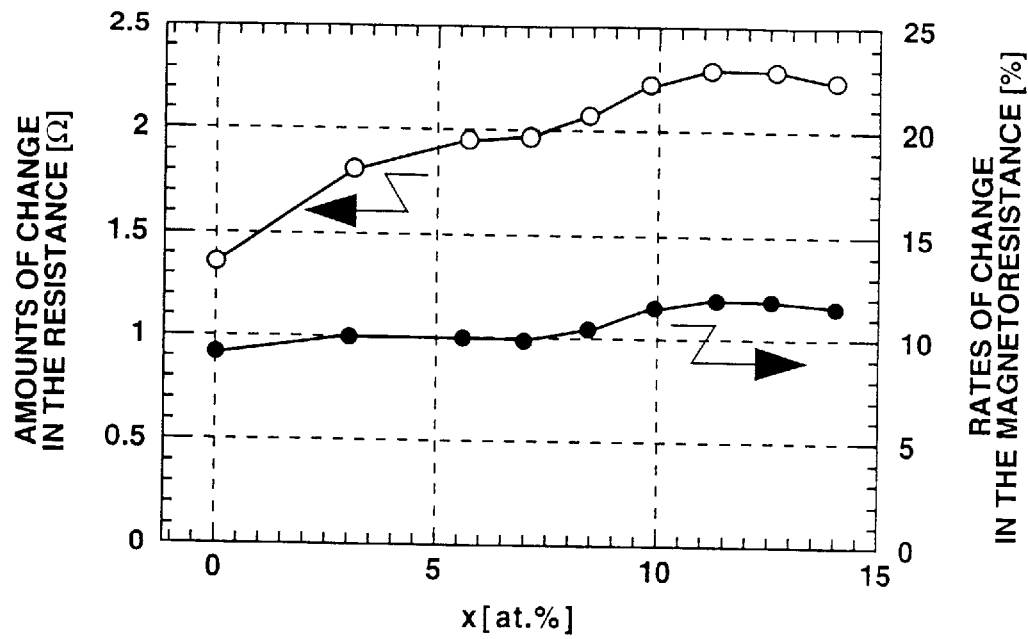
FIG. 6 is a graph showing the relationship among the ratio x of Ta, amounts of change in the resistance and rates of change in the magnetic resistance.

Evaluation of Amount of Change in Resistance and Rate of Change in Magnetoresistance FIG. 6 collectively shows the relationship between the ratio x of Ta in the $(Ni_{80}Fe_{20})_{1-x}Ta_x$ film and the amount of change in the resistance per unit area and the relationship between x and the rate of change in the magnetoresistance.

The amount of change in the resistance is the difference between the maximum resistance and the minimum resistance of the spin-valve film, the resistance of which is changed owing to the direction of the magnetic field. The rate of change in the magnetoresistance is the ratio of the amount of change in the resistance with respect to the minimum resistance of the spin-valve film. That is, the rate of change in the magnetoresistance is {(maximum resistance—minimum resistance)/minimum resistance}. The amount of change in the resistance and the rate of change in the magnetoresistance are values which directly concern the output when the spin-valve film is applied to a magnetic head or a magnetic sensor. As the foregoing values are enlarged, higher outputs can be obtained.

As can be understood from FIG. 6, the amount of change in the resistance and the rate of change in the magnetoresistance are enlarged as the ratio x of Ta is raised. When x=11.5, the amount of change in the resistance and the rate of change in the magnetoresistance have peak values. When x is larger than 11.5, the amount of change in the resistance and the rate of change in the magnetoresistance are undesirably reduced.

When x=0, that is, when no Ta is added, the amount of change in the resistance is 1.35Ω. When x=11.5, a large amount of change in the resistance of 2.31Ω was obtained. When x=0, the rate of change in the magnetoresistance is 9.5%. When x=11.5, a high rate of change in the magnetoresistance of 12.3% was obtained.

It can be considered that the reason why the amount of change in the resistance and the rate of change in the magnetoresistance are enlarged is that addition of Ta to the NiFe film raises the specific resistance of the NiFeTa film and, therefore, the shunt current loss of the sense current is reduced.

As shown in FIG. 5, when x>7, rise in the resistance of the spin-valve film is substantially prevented. It can be considered that the reason why the amount of change in the resistance is enlarged as x is enlarged in a state in which x>7, as shown in FIG. 6, is that change in the crystal structure of NiFeTa causes scattering depending on the spin to be enhanced.

Evaluation of Thermal Stability

Then, the spin-valve film was subjected to heat treatment at 250° C. for 5 hours. Then, the amount of change in the resistance of the spin-valve film realized after the heat treatment has been completed was measured. The ratio of the amount of change in the resistance realized after the heat treatment with respect to the amount of change in the resistance realized before the heat treatment, that is, {(amount of change in the resistance after the heat treatment)/(amount of change in the resistance before the heat treatment)} was used to evaluate the thermal stability of the spin-valve film.

Figure 7:
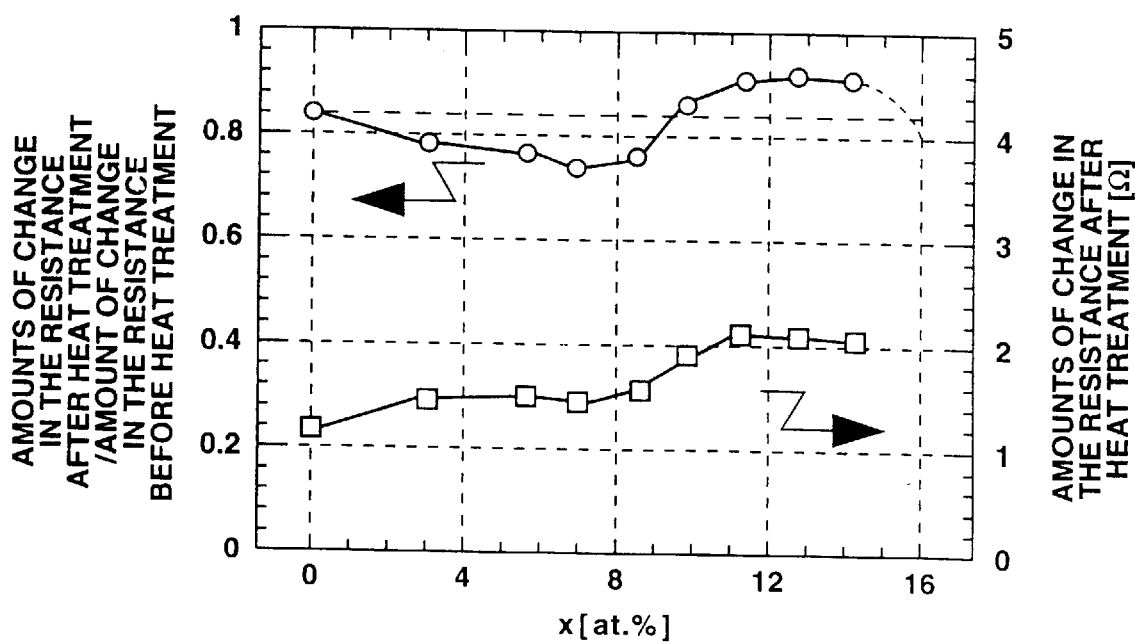
FIG. 7 is a graph showing the relationship between the ratio x of Ta and thermal stability of the spin-valve film.

FIG. 7 collectively shows the relationship between the ratio x of Ta in the $(Ni_{80}Fe_{20})_{1-x}Ta_x$ film and the amount of change in the resistance after the heat treatment and the relationship between x and (the amount of change in the resistance after heat treatment)/(amount of change in the resistance before heat treatment).

As can be understood from FIG. 7, the thermal stability inferior to that realized when x=0 is realized in a state in which 0<x<9. The thermal stability superior to that realized when x=0 is realized in a state in which x>9.

When x=11.5% at which the peak values of the amount of change in the resistance and the rate of change in the magnetoresistance were obtained, the amount of change in the resistance after the heat treatment was substantially doubled as compared with the amount of change in the resistance realized when x=0. As can be understood from results of the experiments, thermal stability superior to that realized when x=0 can be realized when 9<x<16.

As can be understood from the above-mentioned results of the experiments, addition of Ta to the NiFe film which is laminated on the Ta film of the free layer enables the amount of change in the resistance and the rate of change in the magnetoresistance of the spin-valve film to be improved. When the ratio x (atom %) of Ta which is added to the NiFe film satisfies 9<x<16, the thermal stability can be improved.

Therefore, a fact can be understood that addition of Ta to the NiFe film which is laminated on the Ta film of the free layer and regulation of the ratio of Ta enable a spin-valve film to be realized from which not a hitherto before obtained high output can be obtained.

According to the present invention in which Ta is added to the NiFe film which is formed on the Ta film, the output which is realized before the heat treatment can be raised without the necessity of reducing the thickness of each of the films which constitute the spin-valve film. When the amount of Ta which must be added is optimized, the thermal stability of the spin-valve film can be improved.

Since the magnetoresistance-effect device incorporating the spin-valve film is employed in the present invention, a magnetic head with which higher density recording can be performed can be realized.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. A spin-valve film comprising:

a fixed layer in which a direction of magnetization is substantially fixed in a first direction;

a free layer in which a direction of magnetization can be changed relative to the first direction by an external magnetic field; and a non-magnetic layer between the fixed layer and the free layer, wherein, said free layer comprises at least a laminate film having a Ta film and a $(NiFe)_{1-x}Ta_x$ film, and x is 0.09 to 0.16.

2. A spin-valve film according to claim 1, wherein said free layer further comprises a CoFe film.

3. A magnetoresistance-effect device comprising:

a spin-valve film comprising a fixed layer in which a direction of magnetization is substantially fixed in a first direction, a free layer in which a direction of magnetization can be changed by an external magnetic field, and a non-magnetic layer between the fixed layer and the free layer, wherein an external magnetic field is detected by detecting change in the resistance of said spin-valve film, wherein said free layer of said spin-valve film comprises at least a laminate film having a Ta film and a $(NiFe)_{1-x}Ta_x$ film where x is 0.09 to 0.16.

4. A magnetoresistance-effect device according to claim 3, wherein said free layer further comprises a CoFe film.

5. A magnetoresistance-effect head comprising:

a magnetoresistance-effect device detecting an external magnetic field by detecting change in the resistance of a spin-valve film for detecting a magnetic of a signal obtained from a magnetic recording medium, wherein said spin-valve film comprises a fixed layer in which a direction of magnetization is substantially fixed in a first direction, a free layer in which a direction of magnetization can be changed by an external field, and a non-magnetic layer between the fixed layer and the free layer; and said free layer of said spin-valve film comprises at least a laminate film having a Ta film and a $(NiFe)_{1-x}Ta_x$ film where is 0.09 to 0.16.

6. A magnetoresistance-effect magnetic head according to claim 5, wherein said free layer further comprises a CoFe film.

* * * * *